United States Patent Office 2,719,948
Patented Oct. 4, 1955

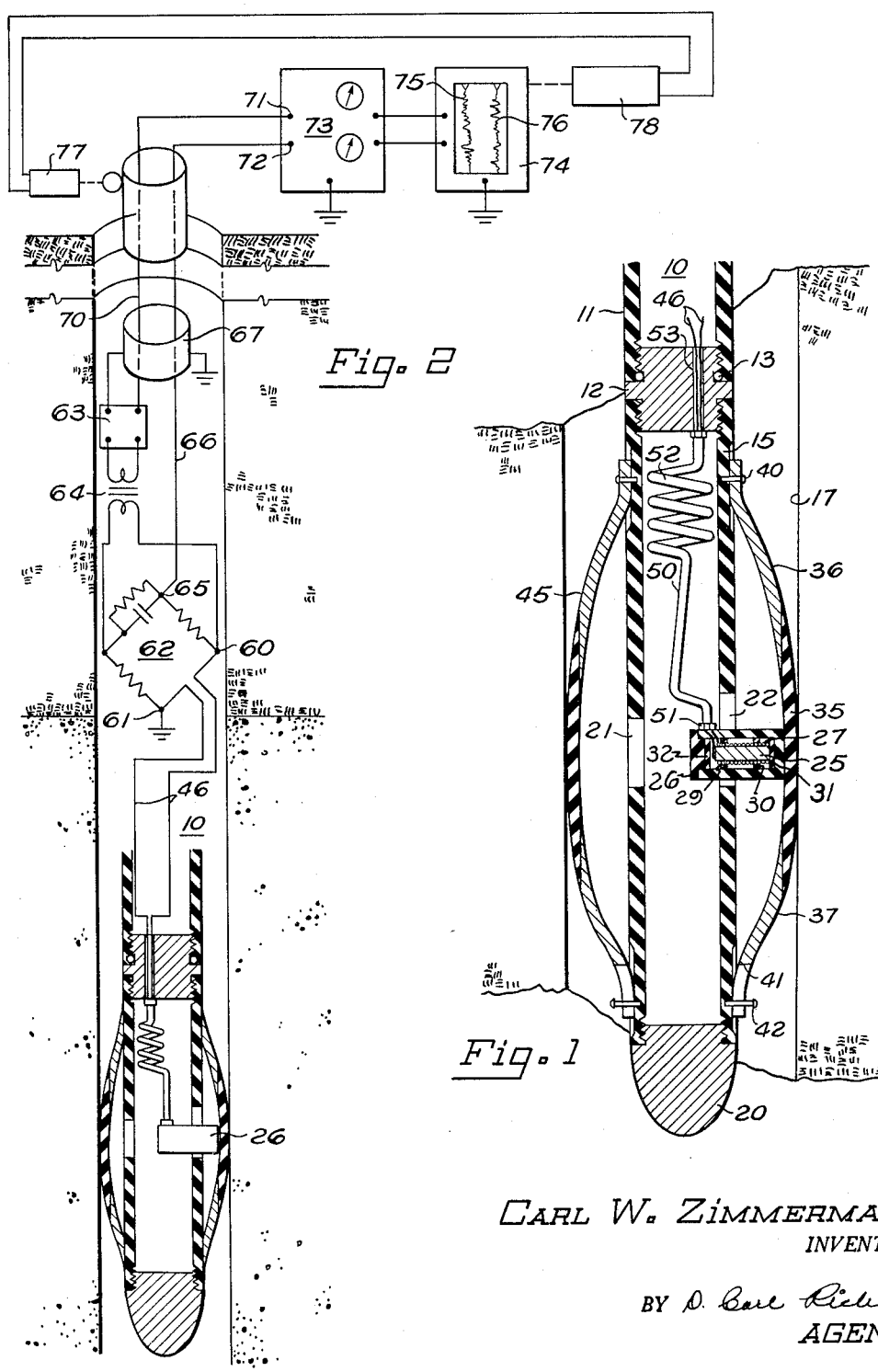

2,719,948

MAGNETICALLY INVESTIGATING MATERIAL AT THE WALL OF A WELL BORE

Carl W. Zimmerman, Dallas, Tex., assignor, by mesne assignments, to Schlumberger Well Surveying Corporation, Houston, Tex., a corporation of Delaware Application May 28, 1952, Serial No. 290,515

8 Claims. (Cl. 324—5)

This invention relates to induction well logging and more particularly to magnetic investigation of materials immediately adjacent the periphery of a bore hole.

It has been shown that a magnetic coupling to media in and adjacent a bore hole may be used as a medium for detecting variations in the conductivity and magnetic susceptibility of the media. Various systems have been devised for producing and utilizing such a magnetic coupling to provide an indication of abrupt changes in the above properties of formations penetrated by a bore hole in order primarily to delineate formations and to guide completion practices in wells drilled for the production of petroleum.

In accordance with the present invention, a system is provided for investigating the resistive and magnetic properties of small volumes of earth materials, the location of the material under investigation being restricted to zones immediately adjacent the wall of the well bore. Such volumes include the mud cake laid down on the bore hole wall during drilling and limited portions of the formations themselves.

More particularly in induction logging in which a measuring system is provided for indicating variations in the impedance of an electrical element connected to input terminals thereof, there is provided an elongated cylinder at least in part of non-magnetic material adapted for movement along the length of a well bore with an inductance resiliently supported from the housing adjacent the non-magnetic portion in a contacting relation with the wall of the bore hole. Means including electrical conductors are connected to the input terminals of the measuring system and to the inductance for producing in the measuring system a measurable effect dependent upon properties of material in the wall of the bore hole. A resilient pressure resistant channel encloses the conductors for preventing changes due to pressure variations in the bore hole in the measurable effect.

In a preferred embodiment of the invention, the axial length of the inductance is substantially shorter than the diameter of the well bore in which it is to operate. Further, it is preferred that the inductance be oriented in its contacting relation with the wall of the well bore with its axis normal to the axis of the well bore.

For a more complete understanding of the present invention and for further objects and advantages thereof, reference may now be had to the following description taken in conjunction with the accompanying drawings in which:

Fig. 1 is a detailed sectional view of the exploring element of the present invention; and Fig. 2 illustrates a magnetic logging system including the present invention.

Referring now to Fig. 1, there is illustrated an elongated tubular housing 10 which includes an upper cylinder 11, only a portion of which is shown, closed at its lower end by a coupler 12. O-ring 13 provides a pressure resistant, liquid tight seal at the threaded juncture between the cylinder 11 and coupler 12. A lower cylindrical member 15 threadedly engages the coupler 12 and extends therefrom. Cylinder 15, coupler 12 and the cylinder 11 together form an elongated exploring unit which is adapted for travel along the length of the bore hole 17. The upper portion of the cylinder 11 together with its supporting cable have been omitted but are of construction well understood by those skilled in the art.

Cylinder 15 preferably is made of an insulating non-magnetic material. Although cylinder 15 is closed at its lower end by a nose piece 20, it is not liquid tight. Rather it is provided at a central portion thereof with apertures 21 and 22. A solenoid 25 encased in a cylindrical housing 26 of insulating non-magnetic material is mounted for movement through aperture 22. The solenoid 25 is comprised of a core, preferably composed of a low reluctance material, surrounded by a coil 27. The solenoid is supported within the housing 26 by a pair of rubber rings 29 and 30 which maintain it spaced from the walls of the housing 26 free from application of pressure to the winding 27 and the core of solenoid 25 when subject to hydrostatic pressures on the housing 26. Discs 31 and 32, preferably of sponge rubber, also provide resilient supports at the ends of solenoid 25.

The solenoid housing 26 is fastened to a strip 35 of insulating material which is fastened or bonded at its upper end to a spring member 36 and at its lower end to a similar spring member 37. Spring member 36 is rigidly secured to the wall of the cylinder 15 by means of a bolt or screw 40. The lower spring member 37 has a slot 41 through which extends a pin or screw 42 which is secured to the wall of the cylinder 15. The spring structure comprised of elements 35, 36 and 37 is thus resilient automatically to adjust itself for variations in the diameter of the bore hole 17. A similar spring structure 45, fastened diametrically opposite the elements 35, 36 and 37, co-acts with the latter elements to maintain the elongated cylinder 10 centrally of the bore hole 17. At the same time the solenoid 25 is maintained substantially in a contacting relation with the walls of the bore hole 17 thereby to control the positional relationship of a magnetic field produced upon excitation of the solenoid 25 with respect to the bore hole wall.

Electrical conductors connected to the terminals of the coil 27 extend from housing 26 into the pressure resistant, water tight chamber within the cylinder 11. Conductors 46 will thus serve as the electrical terminals of the coil 27. A resilient pressure resistant, water tight casing is provided for the conductors 46 and 47. More particularly, a tube 50 is provided with a pressure tight fitting 51 at its lower end and is coupled to the housing 26. The intermediate portion 52 of the tube 50 is spiraled or coiled with the upper end pressure sealed in a channel 53 which extends through the coupler 12. The channel 50 preferably is of material of sufficient strength to withstand the high pressures encountered at depth in liquid filled well bores. With the liquid seals at the housing 26 and at the coupler 12 there is prevented application of pressures to the conductors 46. It is readily understood that variations in pressure on the conductors may produce variations in the electrical character of the impedance looking into the coil from terminals of conductors 46 in the housing 11. By providing the sheath therefor, such unwanted variations are eliminated so that only variations in the impedance of the coil appear at the terminals of conductors 46.

The variations in impedance of the solenoid 25 may be utilized as a measurable effect in the system illustrated in Fig. 2 for the production of useful bore hole logs. Where consistent, the same reference characters have been used in Fig. 2 as in Fig. 1. The conductors 46 are connected to the input terminals 60 and 61 of a Maxwell type impedance bridge 62. Thus conductors 46 and the coil in the housing 26 form one arm of the bridge network. Alternating current from a source 63 is coupled to the bridge network by way of transformer 64 thereby to excite the solenoid in housing 26 to produce a magnetic field which extends for but a limited distance into the formations. As the elongated exploring system 10 is moved along the length of the bore hole, variations in the impedance of the solenoid are measured by the bridge network 62. Preferably the bridge 62 initially is adjusted to balanced condition so that the variations in the formation properties produce bridge unbalance signals proportional to such variation. The output signal from the bridge network appearing between terminals 61 and 65 is transmitted to the surface by way of conductor 66 forming a part of a bore hole cable 67. An outer sheath of the cable 67 is electrically common to terminal 61, both of which are connected to ground. Additionally, the input signal to the bridge 62 is transmitted uphole by way of conductor 70. Thus the input signal to the bridge network appears at terminal 71 of a phase sensitive device 73, and the bridge unbalance similarly appears at terminal 72 of the phase detecting system 73.

The measuring system may correspond substantially to the system illustrated and described in the Patent 2,535,666 issued to Robert A. Broding. In accordance therewith, two output signals are applied to an automatic recording means 74 to produce a first record trace 75 which varies in proportion to variations in the conductivity component of the bridge unbalance signal and a second trace 76 which varies in accordance with the magnetic susceptibility component of the bridge unbalance signal. The recording chart of the recorder 74 may be suitably driven through a Selsyn system including a transmitter 77 driven by the bore hole cable 67 to control receiver 78 so that the length of the recording chart is directly proportional to the bore hole depth.

The solenoid illustrated in Fig. 1 has a length less than one-half the diameter of the bore hole 17 and is oriented with its axis normal to the axis of the bore hole. It may be preferred to orient the solenoid with its axis parallel to the axis of bore hole 17, but in such case, in order to control the penetration of the magnetic field, it will be desirable to make the axial length of the inductance approximately equal to the desired depth of penetration of the magnetic field.

In accordance with one embodiment of the invention particularly suitable for use in bore holes 4½ inches to 8 inches in diameter, the solenoid, mounted as illustrated in Fig. 1, had a core 1 inch in diameter and 2¾ inches long. The winding 27 disposed around the core comprised 794 turns of #24 copper wire providing an inductance of $54.5 \times 10^{-3}$ henries for operation in a Maxwell bridge excited at a frequency of 1,000 cycles per second. With the system thus constructed, the component of the impedance of the solenoid, as viewed from terminals 60 and 61 due to conductivity of the formations adjacent the solenoid, is readily separable from the component of the impedance due to the magnetic susceptibility of the formations.

In order to eliminate extraneous and unwanted effects, it will be desirable to provide an electrostatic shield for the solenoid 25. This may be done substantially in the manner embodied in applicant's co-pending application S. N. 222,362 for an Electrostatically Shielded Magnetic Well Logging System, now Patent No. 2,623,923. Further, the solenoid 25 may be temperature compensated to eliminate drift due to variation in temperature with bore hole depth by provision of compensating means illustrated in applicant's co-pending application S. N. 165,972 for a Temperature Compensated Susceptibility Logging System, now Patent No. 2,640,869.

While preferred embodiments of the invention have been illustrated and described, it will be understood that further modifications may now suggest themselves to those skilled in the art, and it is intended to cover such modifications as fall within the scope of the appended claims.

What is claimed is:

1. In induction logging in which a measuring system is provided for indicating variations in the impedance of an electrical element connected to input terminals thereof, the combination which comprises an elongated cylinder at least in part of non-magnetic material adapted for movement along the length of a well bore, an inductance substantially shorter in length than the diameter of said well bore, resilient means for supporting said inductance from said cylinder adjacent said nonmagnetic part in close proximity to the wall of said bore hole, conductors for connection to said input terminals and connected to said inductance for producing in said measuring system a measurable effect dependent upon properties of material at the wall of said bore hole, and a resilient pressure resistant channel enclosing said conductors and extending from said inductance to said measuring system for preventing changes due to pressure variations in said bore hole in said measurable effect.

2. In induction logging in which a measuring system is provided for indicating variations in the impedance of an electrical element connected to input terminals thereof, the combination which comprises an elongated cylinder having a closed pressure resistant portion enclosing at least a part of the measuring system and a portion of non-magnetic material adapted for movement along the length of a well bore, an inductance substantially shorter in length than the diameter of said well bore, resilient means for supporting said inductance from said cylinder adjacent said non-magnetic portion in close proximity to the wall of said bore hole, conductors for connection to said input terminals and connected to said inductance for producing in said measuring system a measurable effect dependent upon properties of material at the wall of said bore hole, and a resilient pressure resistant channel enclosing said conductors and extending from said closed pressure resistant portion to said inductance for preventing changes due to pressure variations in said bore hole in said measurable effect.

3. In induction logging in which a measuring system is provided for indicating variations in the impedance of an electrical element connected to input terminals thereof, the combination which comprises an elongated housing adapted for movement along the length of said well bore including a liquid tight chamber enclosing at least a part of the measuring system coupled to a non-magnetic tube which has an aperture in the wall thereof, a solenoid substantially shorter in length than the diameter of said well bore, resilient means connected to said housing for supporting said solenoid in close proximity to the wall of said bore hole at a point adjacent said aperture, electrical conductors extending through said aperture for connection to said input terminals and connected to said inductance for producing in said measuring system a measurable effect dependent upon properties of material at the wall of said bore hole, and a resilient pressure resistant sheath enclosing said conductors and extending from said inductance to said liquid tight chamber with a liquid seal at said chamber and at said inductance for preventing changes due to pressure variations in said bore hole in said measurable effect.

4. An induction logging system for investigating the properties of materials in the mud cake zone of a well bore which comprises an elongated housing adapted for movement along the length of said well bore including a liquid tight chamber coupled to a non-magnetic tube having an aperture in the wall thereof, a solenoid substantially shorter in length than the diameter of said well bore, non-magnetic resilient means carried by said housing for supporting said solenoid in close proximity to the wall of said bore hole adjacent said aperture, a resilient pressure resistant channel extending from said solenoid to said liquid tight chamber, electrical conducting means extending from within said chamber to said solenoid and connected to the terminals thereof, and means connected to said conducting means for measuring variations in the impedance of said solenoid as affected by said materials.

5. In induction logging in which a measuring system is provided for indicating variations in the impedance of an electrical element connected to input terminals thereof, the combination which comprises an elongated cylinder of non-magnetic material adapted for movement along the length of a well bore, an inductance having a length which is short compared to the diameter of said well bore, resilient means for supporting said inductance movably with respect to said cylinder in close proximity to the wall of said bore hole, and circuit means for connecting said inductance to said input terminals for producing in said measuring system a measurable effect dependent upon the properties of materials at the wall of said bore hole electromagnetically coupled to said inductance.

6. An induction logging system in which a measuring means provides an indication of variations in the properties of material immediately adjacent the perimeter of a well bore as a function of bore hole depth which comprises an inductance coil having a length which is short compared to the diameter of said well bore, a pressure resistant non-magnetic, non-conductive housing for said coil, means for moving said coil along the length of said well bore, means for maintaining said coil substantially adjacent the wall of said well bore throughout its travel therein, and circuit means for connecting said inductance to said measuring means for producing therein a measurable effect dependent upon the properties of said material.

7. An induction logging system in which a measuring means provides an indication of variations in the properties of material immediately adjacent the perimeter of a well bore as a function of bore hole depth which comprises an inductance having an axial length which is short compared to the diameter of said well bore, a pressure resistant non-magnetic, non-conductive housing for said coil, means for moving said coil along the length of said well bore, means for maintaining said coil substantially adjacent the wall of said well bore throughout its travel therein, and circuit means for connecting said inductance to said measuring means for producing therein a measurable effect dependent upon the properties of said material.

8. The method of investigating material immediately adjacent the walls of an uncased well bore which comprises establishing a varying magnetic field at a generating point immediately adjacent the wall of said bore hole having a sphere of influence substantially smaller in extent than the diameter of said well bore thereby to cause magnetic flux to traverse paths in part including said material immediately adjacent said wall and in part lying within said bore hole, moving said point of generation along the length of said well bore while maintaining said point immediately adjacent said wall, and measuring variations in phase selected properties of said magnetic field as a function of the depth of said point of generation in said well bore.

References Cited in the file of this patent

UNITED STATES PATENTS

| | | |
|---|---|---|
| 1,815,717 | Kranz | July 21, 1931 |
| 2,246,460 | Bassoni | June 17, 1941 |
| 2,353,211 | Zuschlag | July 11, 1944 |
| 2,441,380 | Zuschlag | May 11, 1948 |
| 2,527,170 | Williams | Oct. 24, 1950 |
| 2,531,414 | Engrall | Nov. 28, 1950 |
| 2,535,666 | Broding | Dec. 26, 1950 |
| 2,540,589 | Long | Feb. 6, 1951 |